United States Patent [19]
Tillotson et al.

[11] 3,906,921
[45] Sept. 23, 1975

[54] LAWN MOWER STARTING INTERLOCK

[75] Inventors: Henry B. Tillotson, Minneapolis; Robert A. Kenkel, Edina, both of Minn.

[73] Assignee: The Toro Company, Minneapolis, Minn.

[22] Filed: Aug. 5, 1974

[21] Appl. No.: 494,896

[52] U.S. Cl. .................. 123/179 K; 74/6; 74/850; 123/179 SE; 123/185 BA
[51] Int. Cl.²... G05G 5/08; F02N 3/02; F02N 15/06
[58] Field of Search....... 123/179 K, 179 SE, 185 B, 123/185 BA; 74/6

[56] References Cited
UNITED STATES PATENTS

| | | | |
|---|---|---|---|
| 1,231,637 | 7/1917 | Nikonow | 123/179 K |
| 2,998,809 | 9/1961 | Thomas | 123/179 K |
| 3,739,763 | 6/1973 | Berry et al. | 123/179 K |
| 3,741,187 | 6/1973 | Niebur et al. | 123/179 K |
| 3,782,350 | 1/1974 | McBride | 123/179 K |

*Primary Examiner*—Allan D. Herrmann
*Attorney, Agent, or Firm*—Merchant, Gould, Smith, Edell, Welter & Schmidt

[57] ABSTRACT

A lawn mower starting interlock for the purpose of preventing starting of a mower under a predetermined condition, for example, when a wheel drive mechanism thereof may be engaged. Interlock apparatus applicable to Bendix-type starting mechanisms in which a starter pinion advances along a helical worm gear into engagement with an engine flywheel for driving rotation thereof to start the engine is disclosed. A brake spring carried by the starter pinion normally creates drag which causes the pinion to advance along the helical worm gear into flywheel engagement until the pinion reaches a restraining surface. The brake spring is configured or provided with an axial projection in the direction of advance of the pinion. A lever having a contact surface thereon may be actuated to a position interfering with advance of the projection, thereby impeding advance of the starting pinion and preventing engagement between pinion and flywheel.

9 Claims, 6 Drawing Figures

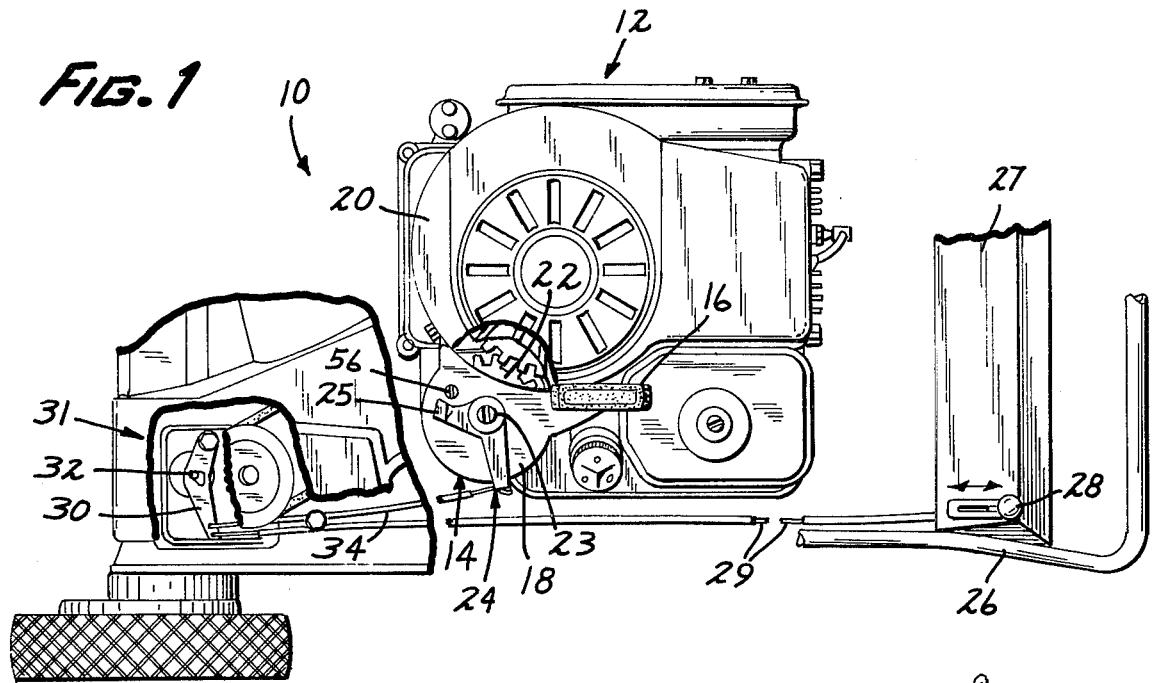
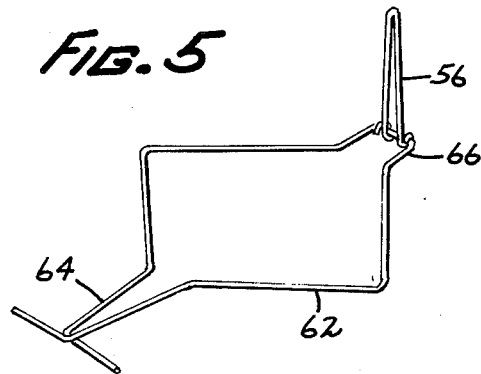
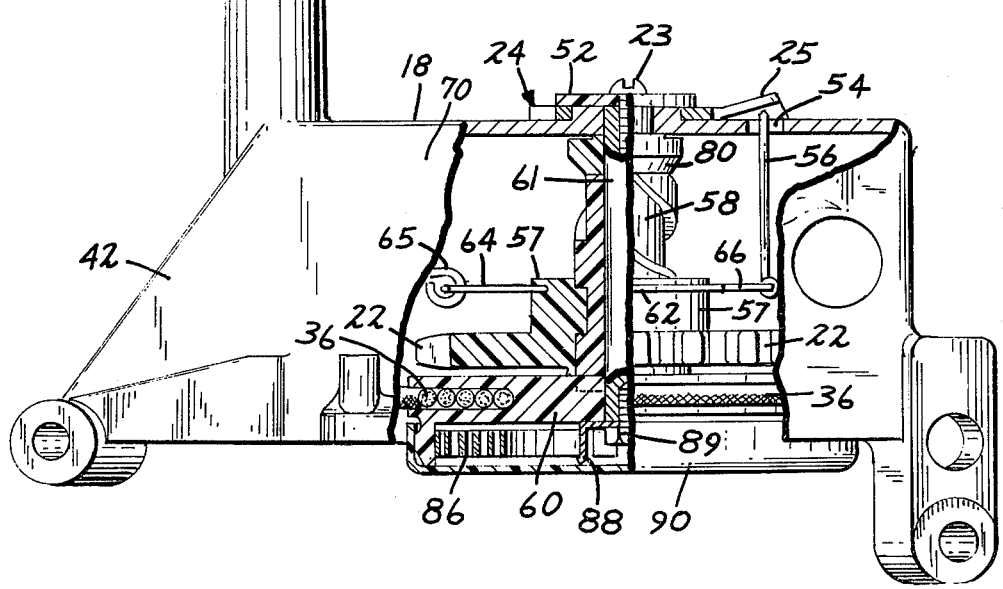

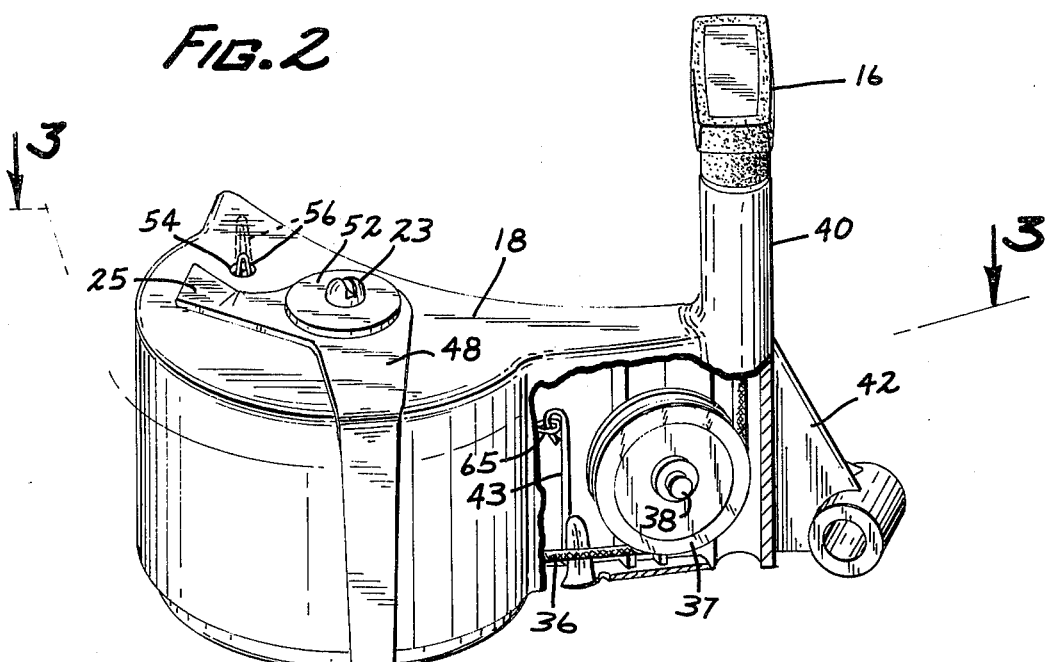
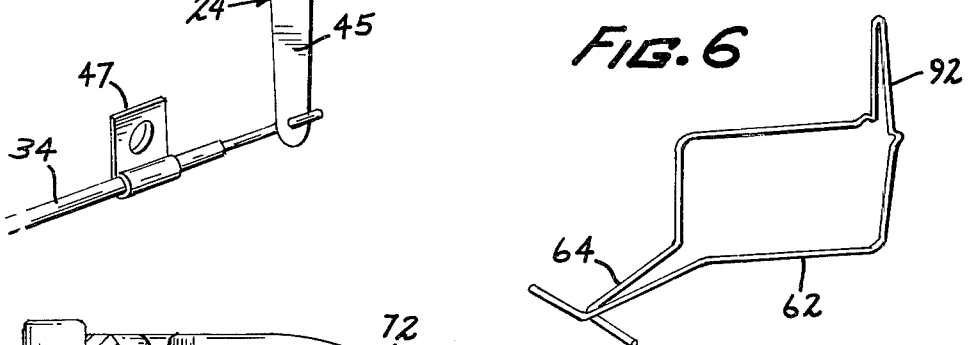
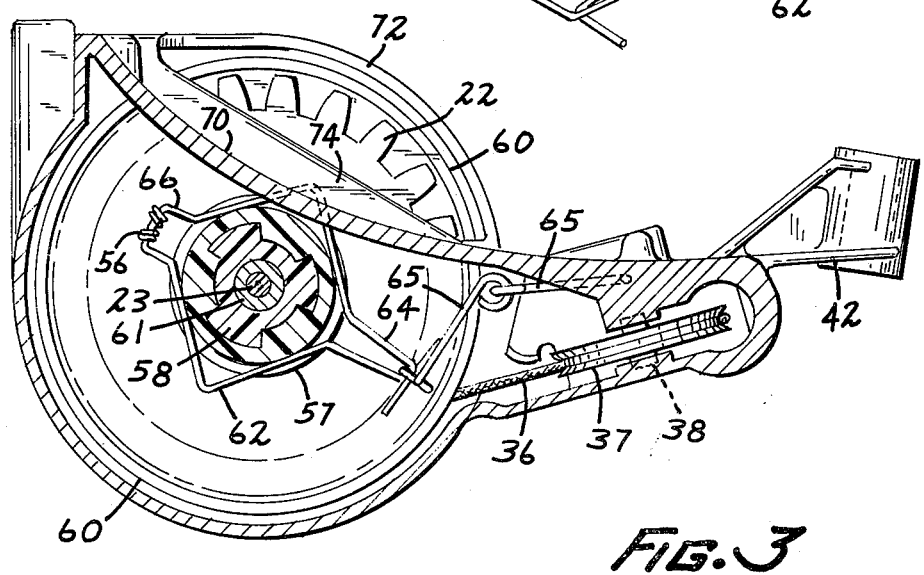

LAWN MOWER STARTING INTERLOCK

BACKGROUND OF THE INVENTION

The present invention relates generally to lawn mower starting mechanisms and more particularly concerns a mechanical interlock mechanism which, under certain conditions, prevents starting of a gas powered mower of the type in which a Bendix type starter having a starter pinion which advances into engagement with the flywheel during the starting process is used.

Due to safety and other considerations, it is sometimes desirable to prevent engagement between the starter pinion and flywheel to protect against starting of the engine of a gas powered lawn mower when the lawn mower is in a predetermined condition. One predetermined condition where this may be useful is applicable to self-propelled mowers. With such mowers, it is advantageous to have a mechanism preventing the starting of the engine during the wheel drive mechanism engagement. Starting during drive engagement could possibly result in loss of operator control of the mower.

One example of a mechanical starter interlock is disclosed in U.S. Pat. No. 3,739,763 issued to R. J. Berry et al. The Berry et al patent discloses an interlock mechanism which is achieved through use of a complex linkage which forces a starter spring carried on the starter pinion to engage a slot in fixed bracket. The spring then prevents advance of the starter pinion into engagement with the engine flywheel.

The shortcomings of the Berry et al interlock and other prior art mechanisms include substantial expenses involved in fabrication and difficulties incorporating such mechanisms into existing starters. The starting interlock apparatus of the present invention, on the other hand, requires a minimum of parts and expense and provides a means of readily adapting present conventional Bendix-type starters to provide a workable and reliable, yet inexpensive starting interlock.

Another shortcoming of some prior art starting interlock mechanisms is that they rely on jamming of the starter pinion, or contact between an obstruction and the starter pinion which may result in gouging or adverse wear. The present invention operates to achieve interlock without significantly more wear or danger to the starter than normal operation without an interlock.

SUMMARY OF THE INVENTION

In accordance with the invention, starting interlock apparatus is provided for preventing starting of a mower engine of the type in which a starting pinion carrying a drag or brake spring thereon advances axially along a path into engagement with an engine flywheel. A projection carried by the spring extends parallel to and in the normal direction of advance of the pinion. The interlock apparatus includes restraining means actuatable to interfere with the travel of said projection to impede the advance of the pinion into engagement with the flywheel. For example, the restraining means may include a pivotable lever having a ramp surface thereon which moves into the path of advance of the projection from said spring. The restraining means are actuated by actuator means which sense a predetermined condition in which starting lock-out is desired and actuate the restraining means on sensing of the predetermined condition.

In one particular class of embodiments of the present invention, a projection is formed directly into the spring carried by the pinion and extends through a hole in the starter housing. In that class of embodiments, an external pivotable lever may be actuated to extend over the hole to prevent advance of the projection formed into the spring, thereby impeding the advance of the starter pinion and preventing starting of the engine.

BRIEF DESCRIPTION OF THE DRAWINGS

A number of additional features and advantages of the invention will no doubt become apparent upon a reading of the following detailed description and upon study of the drawings. Referring particularly to the drawings, wherein the use of like reference numerals throughout the several views indicates like elements:

FIG. 1 is a fragmentary plan view of portions of a rotary lawn mower incorporating an embodiment of the present invention;

FIG. 2 is a perspective view of a starter assembly incorporated into the mower of FIG. 1, the starter assembly including a preferred embodiment of the interlock according to the present invention, portions of the housing of assembly being broken away to illustrate starter features;

FIG. 3 is a view in section of the starter assembly of FIG. 2 taken along line 3—3 of FIG. 2;

FIG. 4 is a side view of the starter assembly of FIG. 2 from the side opposite that shown in FIG. 2, portions of the housing being broken away to illustrate specific internal elements;

FIG. 5 is a brake or drag spring incorporating a projection constructed according to one embodiment of the present invention; and FIG. 6 is a brake or drag spring illustrating an alternate embodiment of the projection.

The invention will now be described in connection with preferred embodiments, but it will be understood that the invention is not limited in scope to those embodiments. On the contrary, all alternatives and variations included within the spirit and scope of the invention as defined by the claims are covered.

DETAILED DESCRIPTION OF THE INVENTION

Turning first to FIG. 1, there is shown portions of a gas powered, self-propelled lawn mower generally designated 10. The mower may be of any conventional type. Included in FIG. 1 are fragmentary portions of a front wheel drive mechanism, a gas-powered engine and a handle assembly. It should be noted that the drawing scale varies between these portions as is necessary and convenient to show important features of each.

Mower 10 includes a gas-powered internal combustion engine 12 with a starting assembly generally designated 14. A starter handle 16 protrudes vertically from a housing 18 of starter assembly 14. A portion of a shroud or cover 20 of internal combustion engine 12 is broken away to show relative horizontal position of a toothed engine flywheel and a starter pinion 22 of starter assembly 14. Shown attached to housing 18 for pivotal movement about an axis defined by a fastener 23 is a pivotable restraining means 24 which may be a pivotable lever having a ramp portion 25 on a leg thereof.

When lever 24 is driven pivotally about the axis of fastener 23, ramp portion 25 may cover a hole in the housing through which a projection carried by a brake spring (shown in succeeding figures) normally extends.

This brake spring in turn may be carried by pinion 22. When pinion 22 advances upward to engage the flywheel, ramp contact surface 25 may prevent such engagement by engaging the projection on the spring.

The remainder of FIG. 1 relates to means for actuating the lock-out apparatus. An operator handle 26 carries a control console 27 including a wheel drive engagement lever 28. Drive engagement lever 28 actuates a bowden wire linkage 29 to shift front wheel drive mechanism generally designated 31 into and out of engagement. In the drive mechanism, a shifter arm 30 pivots about an axis at one end thereof, and is pivotally driven by extension and extraction of the inner wire of bowden wire linkage 29. Shifter arm 30 transmits this motion to a shift pin 32 which engages and disengages the front wheel drive mechanism of the mower. Connected to shifter arm 30 and obtaining its actuation from pivotal movement of arm 30 is a second bowden wire linkage 34, the other end of which is connected to a leg of lever 24 to transfer actuating movement to lever 24. In this way, linkage 34 and arm 30 combine to provide a means for positioning lever 24 in response to engagement or disengagement of the wheel drive mechanism.

FIG. 2 illustrates starter assembly 14 with a portion of outer housing 18 broken away to reveal certain characteristics of the internal structure, including elements of a preferred embodiment of the present invention. A starter cord 36 extends about a pulley 37 mounted for rotation about a shaft 38. Pulley 37 provides a convenient means for redirecting starter cord 36 upward into a vertical tubular portion 40 of housing 18. A free end of starter cord 36 is fastened to starter handle 16. Extending outward from the side of housing 18 adjacent portion 40 is an engine mounting flange 42. Also shown in the cut-away portion of housing 18 is a restraining link 43, fastened to housing 18. Link 43 has one end formed into a loop which engages the looped end of second restraining link shown more completely in FIG. 3.

Features of the construction of the preferred restraining means, i.e., pivotable lever 24, also appear in FIG. 2. Pivotable lever 24 includes a vertically extended actuator arm 45 engaged near its end by bowden wire linkage 34. The outer casing of bowden wire linkage 34 is fastened by means of a bracket 47 to a suitable stationary portion of mower 10. Lever 24 has a body portion 48 formed at a right angle to arm 45. Lever 24 pivots about an axis defined by a fastener 23 which extends through a washer 52 into a shaft located within housing 18. Lever 24 further includes a restraining arm on which ramp or gradually inclined contact portion 25 is located. This surface is ramped to facilitate movement into contact with the projection means.

When shift arm 30 shown in FIG. 1 is in a position maintaining engagement of the wheel drive mechanism of the mower, bowden wire 34 pivots lever 24 about its pivot axis to cover hole 54. Ramp portion 25 may at that time contact projection 56 therefrom. The lever thereby prevents upward axial advance of the projection (shown in dotted line form in the figure) and impedes upward movement of certain portions of the assembly discussed in more detail in connection with other figures.

FIG. 3 is a sectional view taken through the housing along the line 3—3 in FIG. 2. In this view, starter pinion 22 is shown partially sectioned along a central hub 57 thereof. Starter pinion hub 57 has a portion of a helical worm gear formed in an axial recess therein. The axial recess mates with a helical worm on a shaft 58. Shaft 58 is integral with a starter pulley 60 which carries starter cord 36 and is mounted for rotation on inner shaft 61. The sectional view of FIG. 3 is taken at one edge of a groove around the circumference of hub 58 shown in both FIGS. 3 and 4. The circumferential groove carries a brake spring 62 which contacts the groove at four points thereof, one contact point on each of four legs of a diamond shaped central portion of the spring. Spring 62 also includes a V-shaped extension 64 formed by the two free ends thereof. Extension 64 is fastened to a restraining link 65 by means of two oppositely directed short legs at the vertex of extension 64. Restraining link 65 and restraining link 43 together function to permit movement of spring 62 along the axis of starter pinion 22 but prevent any substantial rotational movement of spring 62 about that axis. Opposite V-shaped projection 64 is a U-shaped portion 66 of spring 62 on which is fastened a wire projection 56 shown in section. The rounded upper end of projection 56 is not shown because it is above the section, but the ends thereof are shown wound about U-shaped portion 66. Housing 18 has an arcuately shaped concave rear wall 70, concavely formed to permit extension of a segment of the starter pinion 22 therefrom to engage a flywheel. For this purpose an engagement opening for the starter assembly is defined in the figure by the edges of a generally cylindrical housing wall 72 and a generally planar top wall 74.

FIG. 4 is a side elevational view of starter assembly 14 from the side opposite that appearing in FIG. 2, portions of housing 18 being broken away and certain elements being shown in section to illustrate further features of the starter mechanism. Assembly 14 includes the stationary shaft 61 located centrally and axially of and fixed with respect to housing 18. A number of important starter elements rotate with respect to shaft 61. For example, in the preferred embodiment shown, lever 24 itself is mounted to pivot about the axis of shaft 61 by means of a fastener 23. The upward slope of the ramp portion 25 of lever 24 is particularly noticeable in FIG. 4. This upward ramp provides ease in initiating contact between the lower surface of ramp portion 25 and the projection on the spring carried by the pinion to provide the restraining interlock function.

Received on shaft 61 internally of the housing and rotatable about shaft 61 is tubular shaft member 58 which is fixed to starter pulley 60. Shaft 61 carries the helical worm gear formed on the exterior surface thereof which mates with the helical worm on the interior of starter pinion hub 57. At its uppermost end shaft 58 has a pinion contact surface 80 which contacts the face of pinion 52 when pinion 22 rises upward for engagement with gear teeth on the engine flywheel. Starter cord 36 is wrapped about pulley 60 with one end fastened to the pulley and the opposite end extending about pulley 37, previously discussed, and terminating at starter handle 16.

Starter assembly 18 is a recoil type starter assembly. It therefore includes a rewind spring 86. The inner end of rewind spring 86 is solidly fastened to the stationary shaft 61 by means of a retainer 88 and fastener 89. The opposite, outer end of rewind spring 86 is fastened to pulley 60 to exert a rewind force on the pulley to provide for retraction and rewind of starter cord 36. A spring cover 90 is fastened about the lower end of the pulley and rewind spring assembly.

The wire projection 56, previously mentioned in connection with other figures, extends generally parallel to the axis of shaft 61 and parallel to the path of advance of starter pinion 22 as starter pinion 22 advances upwardly to engage the flywheel. Projection 56 may, as shown more clearly in FIG. 5, be formed of an elongated V-shaped wire fastened by forming its ends about U-shaped portion 66. Projection 56 is thus carried by the brake spring 62 and moves with it during advance of starter pinion 22 on which brake spring 62 itself is carried.

For purposes of understanding the operation of the embodiment as shown in FIG. 4, assume a condition in which the mower wheel drive mechanism is engaged so that bowden wire arrangement 34 pivots lever 24 into a position where ramp portion 25 covers hole 54 and prevents substantial upward movement of projection 56. Should an operator pull upwardly on starter handle 16 the force will be transferred by means of starter cord 36, which unwinds from pulley 60, to cause rotation of pulley 60, and of shaft 58, which is fixed to pulley 60. In response, pinion 22 will tend to rotate with shaft 58 due to the mating helical worm gears on shaft 58 and within pinion hub 57. However, because brake spring 62 on hub 57 is limited in its rotation by means of restraining links 65 and 43, pinion 22 will first tend to advance along the helical worm upward into engagement with the engine flywheel.

Under normal conditions without any interlock, the upward pinion advance caused by restrained brake spring 62 would continue until hub 57 of pinion 22 contacted surace 83. Then actual positive drive would be transmitted from the starter cord to the engine flywheel by means of pulley 82, shaft 80 and pinion 22. In the present instance, however, the upward advance of the pinion will be impeded because projection 56 fastened to brake spring 62 will have its upper surface in contact with a ramp portion 25, which will prevent further movement of projection 56 in a direction parallel to the direction of advancement of the pinion. The result will be slippage between brake spring 62 and pinion 22 at the four contact points between the spring 62 and pinion 22 within the groove in which spring 62 is carried. Hence, pinion 22 will not advance upwardly to engage the flywheel, and the starting interlock function will be effectively accomplished.

There are a number of significant advantages of this type of mechanical interlock mechanism. First, an unusually small number of additional parts are required to achieve the interlock function. The projection 56 is easy to fabricate and the external pivotable lever 24 and associated bowden wire attachments are uncomplicated and reliable in construction and operation. In addition, unlike an interlock mechanism which may contact a pinion face or other annular surface on a pinion to prevent pinion advance, there is no substantial danger of wear or gouging the pinion with the present invention. In fact, because slippage between the brake spring and starting pinion always occurs in normal starting operation at the point when the starting pinion reaches the end of the helical worm gear, there is not significantly more wear associated with attempts to start the engine when the interlock apparatus of the present invention is used than in starters in which an interlock is not present.

FIGS. 5 and 6 are included to show two possible embodiments of a brake spring 56 carrying a projection according to the present invention. In FIG. 5, the projection consists of a separate wire formed in an elongated V-shape with the free ends thereof about a U-shaped portion of the brake spring. In FIG. 6, this additional element is eliminated by forming the brake spring to include a V-shaped projection 92 which extends perpendicular to the main body of the spring. Constructing the projection in this way even further simplifies construction of a starter with interlock apparatus according to the present invention.

From the foregoing description it is apparent that there has been provided, in accordance with the invention, starting interlock apparatus for a lawn mower which fully satisfies the aims and advantages set forth above. While the invention has been described in conjunction with specific embodiments, it is evident that many alternatives and variations will be apparent to persons skilled in the art after a reading of the foregoing description. Accordingly, it is intended to embrace all such alternatives, modifications and variations as fall within the spirit and broad scope of the appended claims.

We claim:

1. Lawn mower starting interlock apparatus for, under a predetermined condition, preventing starting of the engine of a mower having a starter assembly in which a starting pinion carrying a spring advances axially along a path into engagement with a flywheel, comprising:

a. a projection carried by said spring and extending parallel to and in the normal direction of advance of said pinion;

b. restraining means actuatable to interfere with travel of said projection to impede advance of said pinion into engagement with said flywheel; and c. actuator means for sensing said predetermined condition and connected to actuate said restraining means in response thereto.

2. The structure of claim 1 wherein said restraining means includes a pivotable lever mounted proximate said engine having an obstruction portion thereon rotatable into the path of advance of said spring carried projection to limit said advance.

3. The structure of claim 2 wherein said pivotable projection comprises a wire formed into an longitudinally extended shape with the free ends thereof formed about a portion of said spring.

4. The structure of claim 2 wherein said spring includes as a portion thereof an upwardly formed projection which extends substantially to the main body of the spring and parallel to the starter pinion axis.

5. The structure of claim 4 wherein said upward formed projection is generally V-shaped with its vertex projecting upwardly and of rounded form.

6. The structure of claim 5 wherein said obstruction portion includes a ramp contact surface which is inclined in a direction tangential to the arc swept out by pivotal movement of said lever during actuation thereof by said actuator means.

7. The structure of claim 2 wherein said predetermined condition comprises engagement of a wheel drive mechanism of said mower, and said actuator means comprises a bowden wire linkage having one end connected to said lever and an opposite end connected to shiftable means, the physical position of which is indicative of drive mechanism engagement, so that said bowden wire linkage pivotally actuates said lever in response to changes in the physical position of said shiftable means.

8. The structure of claim 2, wherein said starter assembly is substantially enclosed within a housing having a top wall generally perpendicular to said pinion axis, said top wall has a hole therethrough positioned in alignment with said projection means, said projection means is sufficiently longitudinally extended to project through said hole during advancement of said pinion, and said lever is mounted exterior of said housing for pivotal movement to cover said hole.

9. The structure of claim 8, wherein said lever is mounted on said top wall to pivot about said pinion axis.

* * * * *